United States Patent
Kohama

(10) Patent No.: US 8,149,317 B2
(45) Date of Patent: Apr. 3, 2012

(54) DISPLAY DEVICE, PHOTOGRAPHING APPARATUS, AND DISPLAY METHOD

(75) Inventor: Masaki Kohama, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 594 days.

(21) Appl. No.: 12/337,957

(22) Filed: Dec. 18, 2008

(65) Prior Publication Data

US 2009/0160995 A1 Jun. 25, 2009

(30) Foreign Application Priority Data

Dec. 20, 2007 (JP) ................................. 2007-328763

(51) Int. Cl.
*H04N 5/222* (2006.01)
*G06F 3/038* (2006.01)

(52) U.S. Cl. ......... 348/333.11; 348/333.12; 348/333.02; 345/204

(58) Field of Classification Search ............. 348/333.02, 348/333.11, 333.12; 382/216
See application file for complete search history.

(56) References Cited

U.S. PATENT DOCUMENTS

| | | | |
|---|---|---|---|
| 2004/0046896 A1* | 3/2004 | Koga et al. | 348/700 |
| 2004/0179108 A1* | 9/2004 | Sorek et al. | 348/216.1 |
| 2005/0195285 A1* | 9/2005 | Ide | 348/208.99 |
| 2007/0057933 A1* | 3/2007 | Ohno et al. | 345/204 |
| 2007/0236561 A1* | 10/2007 | Anai et al. | 348/46 |
| 2008/0088747 A1* | 4/2008 | Kita et al. | 348/715 |

FOREIGN PATENT DOCUMENTS

| | | |
|---|---|---|
| JP | 2006-217510 A | 8/2006 |
| JP | 2006-238277 A | 9/2006 |
| JP | 2006-311060 A | 11/2006 |
| JP | 2006-311451 A | 11/2006 |

* cited by examiner

*Primary Examiner* — Tuan Ho
*Assistant Examiner* — Shahbaz Nazrul
(74) *Attorney, Agent, or Firm* — Birch, Stewart, Kolasch & Birch, LLP

(57) ABSTRACT

A feature area having a visual feature is analyzed for each of at least three of similar images in a memory card, and the analyzed feature areas are displayed on a display screen while overlapped with a reference image. The visual feature is used to distinguish an image from other images in the plural images. In the case where the images of the feature areas are displayed on the display screen while visually overlapped, when a user touches a touch panel on the display screen, the image corresponding to the feature area to which the touched point belongs is read from the memory card and displayed on the display screen.

6 Claims, 11 Drawing Sheets

DISPLAY DEVICE, PHOTOGRAPHING APPARATUS, AND DISPLAY METHOD

BACKGROUND OF THE INVENTION

1. Field of the Invention

The present invention relates to a display device which displays an image, a photographing apparatus provided with the display device, and a display method with which the display device displays the image.

2. Description of the Related Art

Recently, with speed enhancement of photographing and an increase in capacity of a recording medium, a large amount of similar images can be obtained at one time by continuous photographing and recorded in the recording medium. When the continuous photographing can be performed at the same site, a user can precisely catch a desired moment at the photographing site.

However, when the user photographs the large amount of images in order to precisely catch the moment, it is necessary for the user to reproduce and display the many similar images in the recording medium on a display screen to find out the necessary image from the many similar images after the photographing.

Therefore, in order to find out the necessary image in a short time as much as possible, there is proposed a technique of displaying the many similar images in a multi-screen manner on the display screen (for example, see Japanese Patent Application Publication (JP-A) No. 2006-311451). However, even if the similar images are displayed in the multi-screen manner on the display screen, the user hardly distinguishes the good image from other images in the multi-screen because of the excessively small display.

JP-A No. 2006-217510 discloses a technique, in which similarity is checked for many similar images and the images which are matched with each other to a certain level are not displayed on the display screen. However, in the technique disclosed in JP-A No. 2006-217510, sometimes the image desired by the user is not displayed because the photographing apparatus side selfishly determines the similarity of the image.

JP-A No. 2006-311060 discloses a technique in which the display is not performed in the case of a small difference in degree of focus among the similar images. However, similarly to JP-A No. 2006-217510, sometimes the image desired by the user is not displayed because the photographing apparatus side determines the similarity of the image.

JP-A No. 2006-238277 discloses a technique, in which a correlation among the plural images is checked and the user is informed by sound in the case of the similar images. However, even if the user is informed of the similar image by sound while the user sees the images on the display screen, it is necessary for the user to finally see all the images to find out the desired image.

SUMMARY OF THE INVENTION

The present invention has been made in view of the above circumstances and provides a display device with which a user can perform only simple manipulation to find out a necessary image in a short time from many similar images, a photographing apparatus-provided with the display device, and a display method performed by the display device.

According to an aspect of the invention, a display device includes:

a display screen;

a multiple display section which obtains plural images and displays the plural images on the display screen while the plural images are visually overlapped;

a point specifying acceptance section which accepts specifying manipulation for specifying a point on the display screen;

an area analysis section which analyzes a feature area having a visual feature for each of the plural images, the visual feature being used to distinguish an image from other images in the plural images; and an image display section which displays an image on the display screen, the image corresponding to a feature area to which the point specified by the specifying manipulation belongs in the feature areas analyzed by the area analysis section when the multiple display section displays the plural images while the plural images are overlapped.

In the display device of the present invention, the area analysis section analyzes the feature areas having the visual features, and the multiple display section displays the plural images including the analyzed feature areas on the display screen while visually overlapped. When the user specifies one of the points of the plural image on the display screen, the image display section displays the image corresponding to the feature area to which the specified point belongs on the display screen.

Therefore, the user specifies one of the points of the multiple image in which the feature areas are displayed while overlapped with the reference image, that is, one of the feature areas on the display screen by the manipulation, which allows the user to immediately find out the desired image.

At this point, in the case where the multiple display section displays the similar images on the display screen while the similar images are visually overlapped, possibly the feature area to which the point specified by the specifying manipulation belongs cannot uniquely be identified when the feature areas are overlapped with one another.

For example, when a main subject such as a face is analyzed to set a range of the "main subject" at the feature area, possibly the feature areas are overlapped because the main subject is not moved too much. In the case where attention is focused on chroma saturation or the like, when an area having the chroma saturation different from other images is analyzed to set the area at the feature area, similarly the feature areas are possibly overlapped.

So it is preferable that the multiple display section obtains and displays at least three images, and the area analysis section further includes:

a differential production section which uses one of images displayed by the multiple display section as a reference and produces a differential image based on the reference for the images except for the reference; and a differential place comparison section which computes as the feature area, an area in a large differential place which have a difference exceeding a predetermined degree in the differential image produced by the differential production section, a position of the area in the differential image being not common to that of other large differential place in other differential image.

In the configuration in which the differential place comparison section computes the areas of the different large differential places as the feature areas, for example, the feature areas corresponding to the three images can be multiple-displayed on the display screen without overlapping the feature areas. Therefore, the three feature areas of the three images can be correlated with the three images one to one, and one of the feature areas can be specified to display the image to which the specified feature area belongs on the display screen.

In the configuration, the differential place comparison section does not use speculation of an object such as "main subject" and "chroma saturation" on which a human focuses, but the differential place comparison section simply performs processing for mechanically finding out the place relatively different from those of other images, so that mistaken computation caused by the improper speculation is not generated for the feature area.

The point specifying acceptance section may be configured to accept specification of a point on the display screen specified with the use of a pointing device such as a mouse. However, it is preferable that the point specifying acceptance section accepts manipulation on the display screen as the specifying manipulation.

When the point specifying acceptance section is, for example, the touch panel which accepts the manipulation on the display screen, the user can easily specify the specifying point on the display screen by the finger while seeing the image on the display screen.

According to another aspect of the invention, a photographing apparatus includes:

an imaging section which photographs a subject to obtain an image of the subject in a form of image data;

a display screen on which the image is displayed;

a multiple display section which obtains plural images obtained by the photographing of the imaging section and displays the plural images on the display screen while the plural images are visually overlapped;

a point specifying acceptance section which accepts specifying manipulation for specifying a point on the display screen;

an area analysis section which analyzes a feature area having a visual feature for each of the plural images displayed by the multiple display section, the visual feature being used to distinguish an image from other images in the plural images; and an image display section which displays an image on the display screen, the image corresponding to a feature area to which the point specified by the specifying manipulation belongs in the feature areas analyzed by the area analysis section when the multiple display section displays the plural images while the plural images are overlapped.

In the photographing apparatus of the present invention, the multiple display section performs the multiple display of the similar images photographed by, for example, the imaging section, and the user can perform the specifying manipulation to immediately find out the desired image from the similar images while seeing the multiple-displayed images.

Although usually a small display screen is mounted on the camera or the like, the displayed image is easily seen and specified by performing the multiple display.

It is preferable that the imaging section has a continuous photographing function of performing continuous photographing to continuously obtain plural images, and the multiple display section obtains and displays the plural images obtained by the continuous photographing function.

Accordingly, the user can immediately find out the desired image from the plural images obtained by the continuous photographing function while seeing the plural images displayed by the multiple display section.

It is also preferable that a photographing interval of the continuous photographing is set in the continuous photographing function, the imaging section continuously performs the photographing at the set photographing intervals, and the multiple display section thins out images obtained by the continuous photographing function according to the photographing interval to display the remaining plurality of images.

When the continuous photographing has a short photographing interval, there is a high probability of overlapping the feature areas. When the overlapping area is removed from the feature area, since the feature area remains only in the extremely restricted area on the image, the specifying manipulation for specifying the photographing area of the desired image becomes difficult. Therefore, the specifying manipulation can easily be performed when the images are thinned out according to the photographing interval to display the remaining plural images.

It is preferable that a shutter speed of the photographing is set in the continuous photographing function, the imaging section continuously performs the photographing at the set shutter speed, and the multiple display section thins out images obtained by the continuous photographing function according to the shutter speed to display the remaining plural images.

In the case where the shutter speed is lowered in each photographing time of the image obtained by the continuous photographing function, the subject blurs when the subject is the moving object, and the large overlapping of the feature areas or the extremely restricted feature area are generated, whereby the feature area of the desired image is hardly specified. Therefore, the specifying manipulation can easily be performed when the images are thinned out according to the shutter speed to display the remaining plural images.

It is preferable that the photographing apparatus includes a switching acceptance section which accepts switching manipulation for switching the image displayed by the multiple display section, and the multiple display section displays plural images while the plural images are visually overlapped instead of currently-displayed images when the switching acceptance section accepts the switching manipulation, the plural images being obtained by thinning out the images obtained by the continuous photographing function.

In the case where the images of the feature areas are displayed on the display screen while the images are thinned out, the images of the feature area are displayed at predetermined intervals and the images of other feature areas are not displayed. Therefore, when the switching acceptance section accepts the switching manipulation, preferably the images of the feature area are displayed at different predetermined intervals.

According to other aspect of the invention, a display method includes:

a multiple display step of obtaining plural images and displaying the plural images on a display screen while the plural images are visually overlapped;

an area analysis step of analyzing a feature area having a visual feature for each of the plural images, the visual feature being used to distinguish an image from other images in the plural images;

a point specifying acceptance step of accepting specifying manipulation for specifying a point on the display screen when the plural images are displayed on the display screen while visually overlapped; and an image display step of displaying an image on the display screen, the image corresponding to a feature area to which the point specified by the specifying manipulation belongs in the feature areas analyzed by the area analysis step.

For example, when the display method is performed by a personal computer, the user can easily find out the desired image from many similar images stored in a hard disk drive and the like, while seeing the images on the display screen. Because the display method can be easily performed by a mobile device provided with the display device using a program or the like, the display method is useful in other mobile devices.

As described above, the present invention can realize the display device with which the user can perform only the simple manipulation to find out the necessary image in a short time from many similar images, the photographing apparatus, and the display method.

DETAILED DESCRIPTION OF THE INVENTION

An exemplary embodiment of the present invention will be described below with reference to the drawings.

Figure 1:
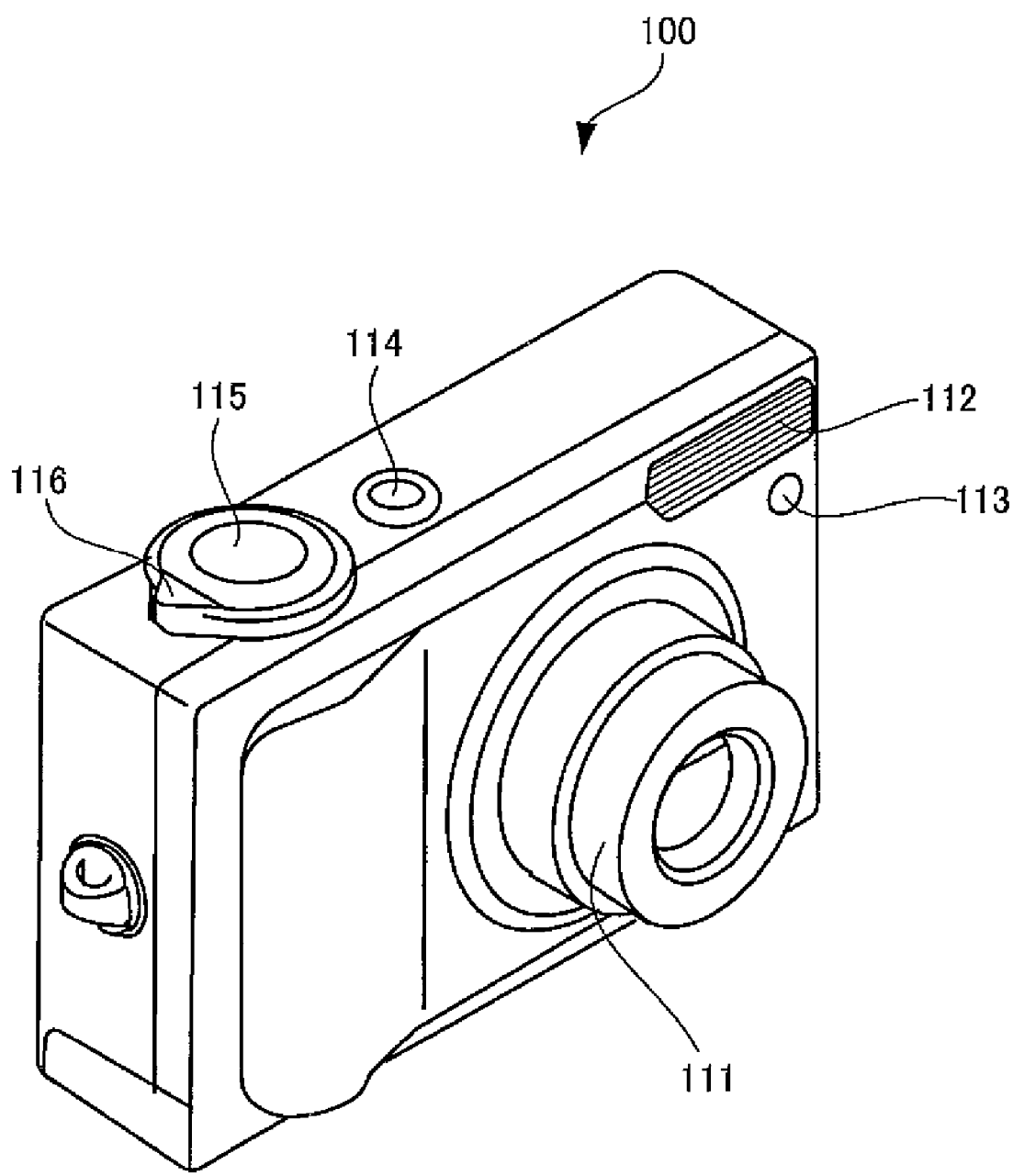
FIG. 1 is a perspective view showing an appearance of a digital as a photographing apparatus according to an embodiment of the present invention when viewed from obliquely above.

FIG. 1 is a perspective view showing an appearance of a digital camera as a photographing apparatus according to an embodiment of the present invention when viewed from obliquely above. The digital camera of the embodiment has a photographing mode and a reproduction mode. The digital camera acts as the display device of the present invention when the digital camera is switched to the reproduction mode.

A configuration and an operation of the digital camera will be described with reference to FIG. 1, and then an operation of the digital camera as the display device will be described.

The digital camera 1 of FIG. 1 catches subject light to produce image data. A front face of the digital camera 1 includes a zoom lens barrel 111, in which an optical zoom lens is incorporated, a fill-in light emission window 112 through which flash light is emitted in synchronization with photographing, and an AF auxiliary light lamp 113 which improves Auto Focus (AF) accuracy in low contrast such as a dark site.

A power switch 114 and a release button 115 are provided in an upper surface of the digital camera 1, and a rotary mode dial 116 is provided around the release button 115. Turning the mode dial 116 can switch between a still-image mode and a moving-image mode.

Figure 2:
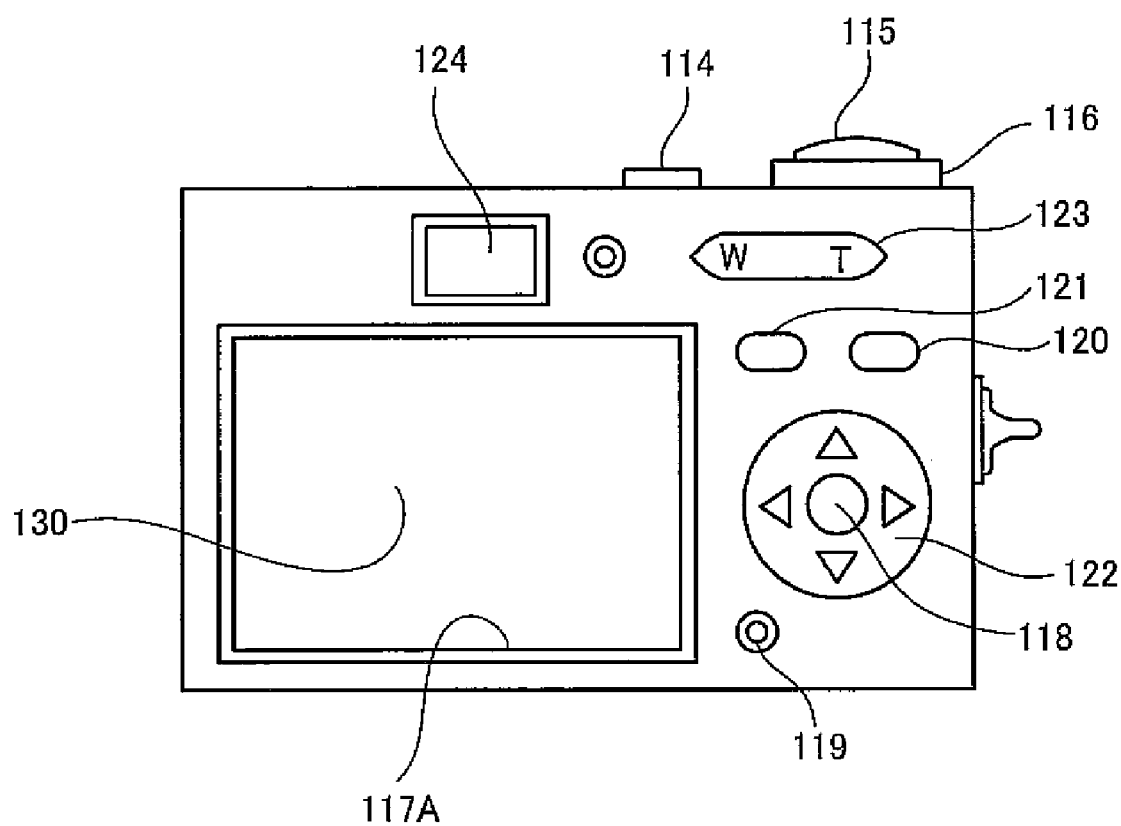
FIG. 2 is a view showing an appearance of a backside of the digital camera 1 shown in FIG. 1.

FIG. 2 shows an appearance of a backside of the digital camera shown in FIG. 1.

The backside of digital camera 1 of FIG. 2 includes a display screen 117A of LCD, a finder 124, a MENU/OK button 118, a DISP/BACK button 119, a photo mode button 120, a reproduction button 121, a cross button 122, and a zoom button 123.

The display screen 117A of LCD is used to display an image formed by the image data produced by catching the subject light through the photographic lens and information in various settings. In the embodiment, a touch panel 130 is provided on the display screen 117A.

The MENU/OK button 118 is used to display various menus on the display screen 117A of LCD in photographing or reproduction or to select and determine the desired menu from the displayed menus.

The DISP/BACK button 119 is used to switch a screen state of the reproduced image displayed on the display screen 117A of LCD, to return manipulation performed with the MENU/OK button 118 to an immediately preceding state, and to cancel the manipulation.

The photo mode button 120 is used to set the number of pixels, sensitivity, tinting, and the number of prints.

The reproduction button 121 is used to reproduce and display a photographic image recorded in a recording medium 1059 on the display screen 117A of the LCD 117.

A role of the cross button 122 depends on various modes. For example, the cross button 122 acts as a macro button (not shown) or a flash button (not shown) in the still-image mode, and the cross button 122 acts as a selection button (not shown) used to select a thumbnail displayed on the display screen 117A of LCD in the reproduction mode. The macro button is used to switch whether or not macro photographing is performed. The mode is switched to a macro photographing mode when the macro button is pressed once, and the macro photographing mode is released when the macro button is pressed again. The flash button is used to sequentially switch a flash state in each press like auto flash, red-eye-reduction flash, forced flash, flash prohibition, flash in slow shutter, and auto flash.

The zoom button 123 is used to zoom in toward a telephoto-side by pressing the zoom button 123 rightward and to zoom out toward a wide angle-side by pressing the zoom button 123 leftward.

Although described in detail later, the touch panel 130 provided on the display screen is operated in the reproduction mode.

Figure 3:
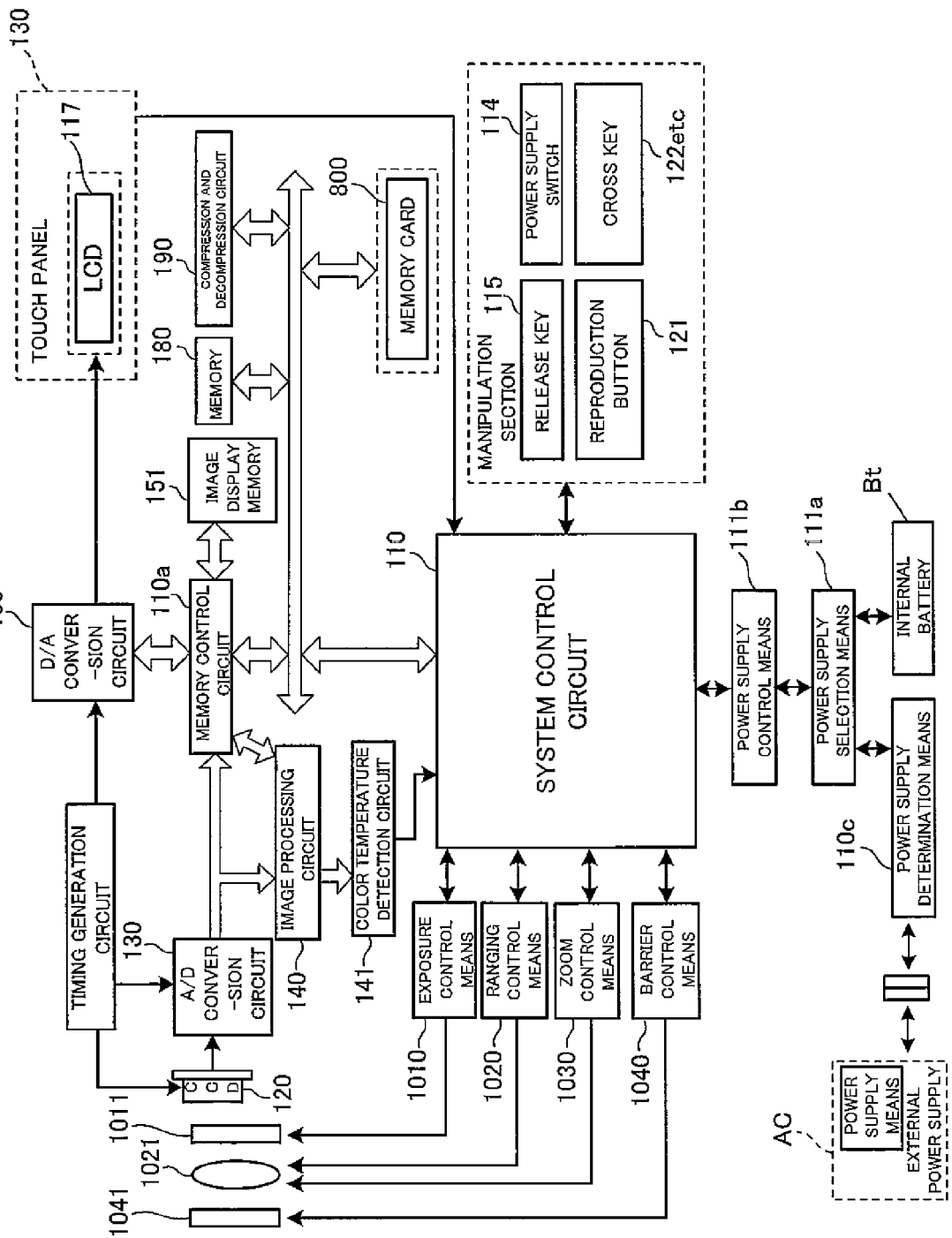
FIG. 3 is a block diagram showing a configuration of the digital camera of FIGS. 1 and 2.

FIG. 3 is a block diagram showing a configuration of the digital camera 1 of FIGS. 1 and 2.

In the digital camera 1 of the embodiment, a system control circuit 110 controls all pieces of processing. For example, the system control circuit 110 is formed, for example, by a microcomputer.

The power switch 114, release button 115, cross button 122, and reproduction button 121 of FIG. 1 and the like are connected to an input section of the system control circuit 110. When a manipulation signal is supplied from each manipulator to the system control circuit 110, processing is started according to at least one of manipulations of the manipulators. In FIG. 3, the manipulators are put into one manipulation section.

For example, during the photographing mode, in response to the manipulation of the zoom button 123 provided in the backside of the digital camera 1 of FIG. 1, the system control circuit 110 performs control in which the system control circuit 110 instructs zoom control means 1030 to move a zoom lens in a photographic lens 1021 to a focal distance position corresponding to a manipulation position of the zoom button 123. The system control circuit 110 also performs control in which the system control circuit 110 instructs lens barrier control means 1040 to open a lens barrier 1041 according to the manipulation of the power switch 114.

As described above, the digital camera 1 of the embodiment includes the zoom lens barrel. Therefore, during the photographing mode, the power switch 114 is manipulated to send out the lens barrel, and the zoom button 123 is manipulated to cause zoom control means 1020 to change a sending amount of the lens barrel, thereby moving the zoom lens 123 to change the focal distance of the photographic lens 1021.

The system control circuit 110 performs TTL (Through The Lens) ranging and TTL photometry based on the image data produced by a Charge Coupled Device (hereinafter referred to as CCD) 120. In the TTL ranging, the system control circuit 110 instructs the ranging control means 1020 to move the focus lens in the photographic lens 1021 along an optical axis, the CCD 120 produces image data at predetermined time intervals while the focus is moved, and contrast of the produced image data is detected at predetermined intervals to detect the focus. That the focus is detected while the focus lens is moved along the optical axis to move the focus from a far side to a near side is referred to as AF search in the following description.

The system control circuit 110 detects luminance of the image data produced by the CCD 120, thereby performing the TTL photometry.

According to photometric result of the TTL photometry, the system control circuit 110 instructs the exposure control means 1010 to adjust an aperture diameter of a diaphragm.

When the subject has the low luminance as a result of the TTL photometry, the system control circuit 110 causes a fill-in light emission device (not shown) to emit the fill-in light though the fill-in light emission window of FIG. 1.

A photographing operation of the digital camera 1 will simply be described with reference to FIG. 3.

When the power switch 114 is turned on in the manipulation section, the system control circuit 110 totally controls the whole operation of the digital camera 1 to start the photographing processing according to a procedure of an entire processing program stored in an internal memory of the system control circuit 110. In order to restrain power consumption of an internal battery Bt, an electric power is supplied to each block from the internal battery Bt through power supply selection means 111*a* and power supply control means 111*b*, after the system control circuit 110 (the electric power is always supplied to the system control circuit 110 from the internal battery Bt) detects the turn-on of the power switch of the manipulation section. When the electric power is supplied to each block, the digital camera 1 becomes an operation state.

In the embodiment, in addition to the internal battery Bt, the digital camera 1 can be connected to an alternating-current power supply AC. When the digital camera 1 is connected to the alternating-current power supply AC, the system control circuit 110 is notified through power supply determination means 111*c*, power supply selection means 111*a*, and power supply control means 111*b* that the system control circuit 110 is connected to the alternating-current power supply AC, and the electric power is switched from the internal battery Bt to the alternating-current power supply AC to supply the electric power to each section from the alternating-current power supply AC.

The photographing operation of the digital camera 1 in the operation state will be described below along with the configuration thereof.

A photographing optical system is incorporated in the lens barrel 100 of FIG. 1. The photographing optical system includes the photographic lens 1021 and a diaphragm 1011 for adjusting a light quantity. The photographic lens 1021 includes the focus lens and the zoom lens. A lens barrier 1041 is also provided to protect the lenses. When the power supply switch 114 is turned on, lens barrier control means 1040 releases the lens barrier 1041, and the lens barrel 100 is sent out to expose the photographic lens 1021 as shown in FIG. 1.

When the mode dial is switched to the photographing side in turning on the power switch, the image data showing the subject image formed on the CCD 120 through the photographic lens 1021 in the lens barrel is thinned out at predetermined intervals (for example, every 16.5 ms) based on a timing signal from the timing generation circuit 121, and the image data is supplied to an A/D conversion circuit 130. The A/D conversion circuit 130 converts the image data from analog image data into digital image data, the digital image data is introduced to an image processing circuit 140 under the control of a memory control circuit 110*a*, and the image processing circuit 140 separates RGB image data into a R color signal, a G color signal, and a B color signal. The R color signal, the G color signal, and the B color signal are introduced to the system control circuit 110 or a color temperature detection circuit 141 through a bus under the control of the memory control circuit 110*a*. Information on the color temperature detected by the color temperature detection circuit 141 is supplied to the system control circuit 110, and a white balance adjusting section (not shown) in the system control circuit 110 adjusts white balance.

After the white balance is adjusted by the white balance adjusting section of the system control circuit 110, a gamma-correction section (not shown) in the system control circuit 110 performs gamma-correction such that the subject image can be displayed on the display screen 117A (see FIG. 1) of LCD included in the digital camera 1, a YC conversion section converts the signal into a YC signal, and the YC signal is stored in an image display memory 151. The one-frame YC signal stored in the image display memory 151 is read under the control of the memory control circuit 110*a*, and the one-frame YC signal is introduced to a D/A conversion circuit 160. Then, the one-frame YC signal is converted into the analog image data and supplied to the LCD 117.

In order to be able to supply the new image data to the LCD 117 at predetermined intervals, the image display memory 151 is provided, and the pieces of image data of at least two frames are stored in the image display memory 151 such that the time the image data is supplied to the LCD 117 can be adjusted well, which enables the display of the moving image in which the images stretch by switching the images at predetermined intervals.

The system control circuit 110 instructs the ranging control means 1020 to always keep the focus lens of the photographing optical system at a focal point based on the ranging result, and the system control circuit 110 instructs the zoom control means 1030 to always keep the zoom lens of the photographic lens 1021 at a position corresponding to zoom magnification of the zoom switch manipulation, so that a through image with the zoom magnification can be displayed on the display screen according to the zoom switch manipulation position while being always in focus.

When the release button 115 is pressed halfway, the system control circuit 110 causes the exposure control means 1010 to adjust the aperture diameter of the diaphragm 1011 according to a TTL photometric value in the halfway press, and the system control circuit 110 instructs the ranging result means 1020 to move the focus lens to the focal position according to the TTL photometric value in the halfway press. Thus, the system control circuit 110 moves the focus lens to the focal position while adjusting the aperture diameter of the diaphragm 1041.

When the release button is fully pressed, the system control circuit 110 instructs the timing generation circuit 121 to supply an exposure start signal to the CCD 120 in order to start the exposure of the CCD 120. When the subject has the low luminance in the photographing, the system control circuit 110 performs the photographing while instructing the fill-in light emission device (not shown) to emit the fill-in light though the fill-in light emission window 112. When a predetermined shutter time elapses, the system control circuit 110 instructs the timing generation circuit 121 to supply an exposure end signal to the CCD 120. The exposure of the CCD 120 is ended in synchronization with the exposure end signal, the system control circuit 110 supplies the image data to the A/D conversion circuit 130.

The A/D conversion circuit 130 converts the analog image data supplied from the CCD 120 into the digital image data, and the digital image data is supplied to a memory 180 through the bus under the control of the memory control circuit 110a. After the image data formed by all the pixels included in the CCD 120 is stored in the memory 180, the image data is read under the control of the system control circuit 110, and the white balance adjusting section of the system control circuit 110 adjusts the white balance by adjusting amplitudes of the R signal, G signal, and B signal with gains set in color amplifiers. The image data to which the gamma correction and the conversion into the YC signal are performed is supplied to a compression and decompression circuit 190 through the bus, and the image data including the YC signal is compressed and stored in a memory card 800.

Thus, the system control circuit 110 controls the photographing operation of the digital camera and the image data obtained by the photographing is recorded in the memory card 800. In the embodiment, a high-frame rate CCD is used as the CCD 120, so that 30 continuous photographing images can substantially be obtained every second in the continuous photographing.

During the photographing mode, the digital camera of the embodiment is operated as described above.

Then, the reproduction mode will be described.

The digital camera acts as the display device when the reproduction mode button 121 of FIG. 2 is manipulated to set the digital camera in the reproduction mode. That is, an example of the display device of the present invention is formed by the digital camera in the reproduction mode. In the embodiment, an example of the display device of the present invention includes the system control circuit 110, memory control circuit 110a, image display memory 151, D/A conversion circuit 160, LCD 117, compression and decompression circuit 190, and memory card 800 of FIG. 3.

When the reproduction button 121 is manipulated, the system control circuit 110 reads the compressed image data from the memory card 800, the compression and decompression circuit 190 decompresses the compressed image data to restore the image data. The system control circuit 110a instructs the memory control circuit 110a to transfer the image data to the image display memory 151 though the bus.

After the image data is transferred to the image display memory 151, the image data is supplied to the LCD 117 through the D/A conversion circuit under the control of the memory control circuit 110a, and the image is displayed on the display screen 117A of the LCD 117 based on the image data.

At this point, in the embodiment, pieces of information on the continuous photographing image, a photographing site, and a photographing time are recorded in a tag area in a header of an image file stored in the memory card 800. Therefore, the system control circuit 110 reads a similar image from the memory card 800 based on the information in the tag area, and the system control circuit 110 performs processing for multiple-displaying the plural similar images on the display screen 117a in cooperation with the memory control circuit 110a and the LCD 117.

That is, the system control circuit 110 reads the information in the tag area to read the similar image. In the case where only two similar images exist in the memory card 800, the system control circuit 110 performs processing for displaying the similar images in a multi-screen. When one of the displayed similar images is specified through the touch panel, the specified image is displayed on the whole of the display screen.

When at least three similar images exist in the memory card 800, the similar images become smaller in the multi-screen display, and the specifying manipulation is hardly performed while the image is hardly seen. Therefore, the multiple image in which the similar images are combined is displayed on the display screen. A feature area is analyzed for each similar image in order to distinguish the similar images from one another in the multiple image to specify the similar image with the touch panel. The feature area has a visual feature which can be distinguished the similar images from one another.

Figure 4:
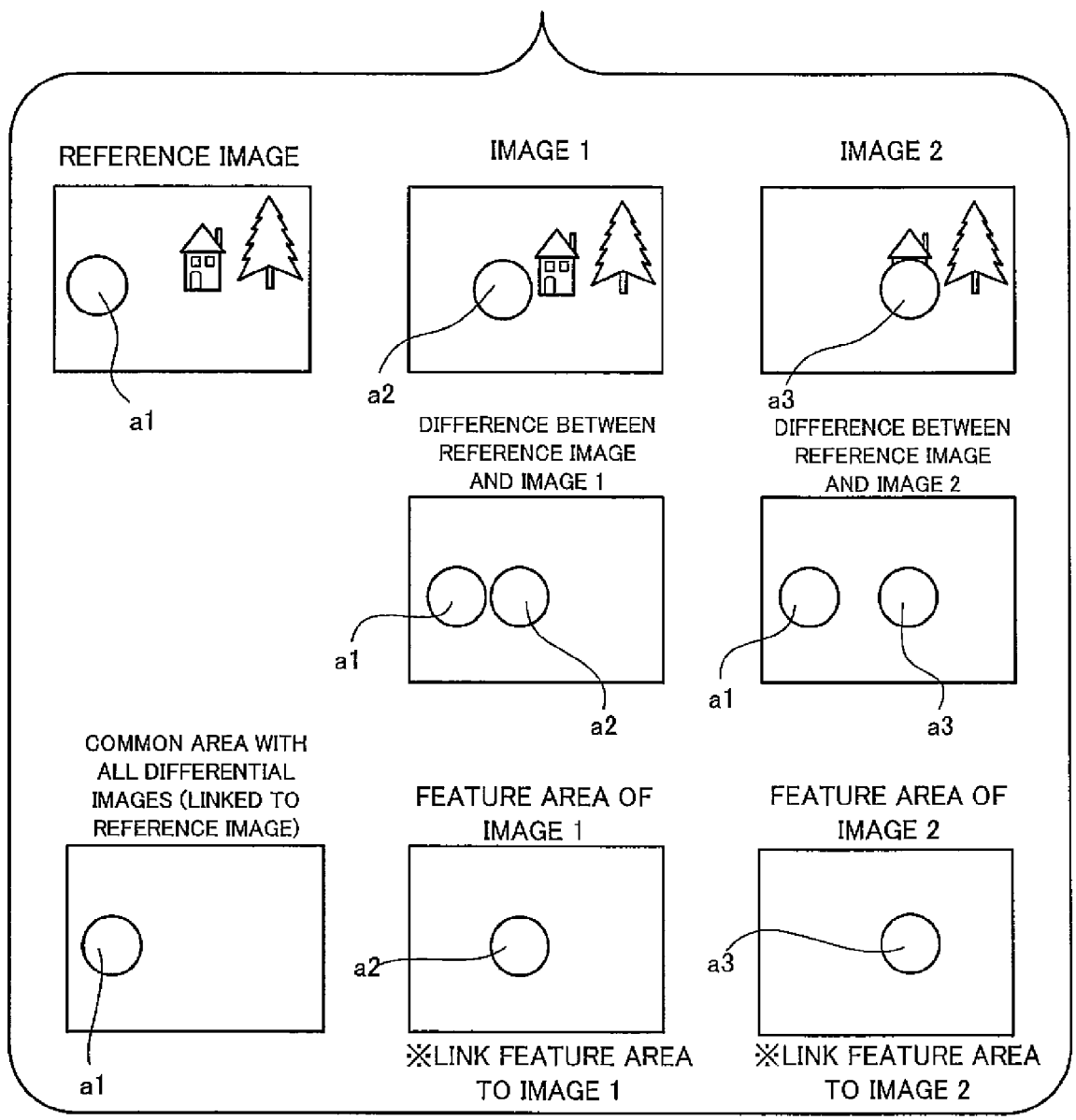
FIG. 4 is a view explaining analysis performed by a system control circuit.

FIG. 4 is a view explaining the analysis performed by the system control circuit 110.

An upper stage of FIG. 4 shows three continuous photographing images by way of example. A middle stage of FIG. 4 shows a large differential place at which a difference between a reference image of an initial image and a next image 1 in the continuous photographing images exceeds a predetermined degree and a large differential place at which a difference between the reference image and a second next image 2 in the continuous photographing images exceeds a predetermined degree. A lower stage of FIG. 4 shows an area (hereinafter referred to as feature area) of the large differential place whose position in the image is different from that of the large differential place of the other differential image in the large differential places of the middle stage of FIG. 4.

In the three continuous photographing images of the upper stage of FIG. 4, circles designated by the numerals a1 to a3 are, for example, a moving ball, and the area in which the ball exists is changed to a1, a2, and a3 in each photographing with no change in background.

In the embodiment, when a user see the desired image by performing the specifying manipulation of the image from the similar images, the fact that the user performs the specifying manipulation through the touch panel is taken into account, the feature area of each image is analyzed such that the reference image, the image 1, and the image 2 respectively correspond to touch positions of the touch panel, and processing for computing the feature area is performed.

For example, the large differential place shown in the middle stage is obtained by a differential operation between the image 1 and the reference image and a differential operation between the image 2 and the reference image, and the ball area a1 of the reference image exists in the two operation results obtained by the differential operations.

Therefore, because the ball area a1 of the reference image is the large differential place which is common to each images, the ball area a1 is set at the feature area of the reference image, and processing for subtracting the ball area a1 from the differential image of the middle stage is performed to compute the feature areas of the image 1 and image 2.

Therefore, the ball areas a1, a2, and a3 shown in the lower stage become the feature areas to correspond to the reference image, the image 1, and the image 2, respectively. That is, when the specifying manipulation is performed to one of the points of the feature areas in the multiple image though the touch panel, one of the reference image, image 1, and image 2 corresponding to the specified point can uniquely be determined, and the corresponding image is displayed.

When the differential operation and the subtraction processing are performed as described above, the multiple image of the reference image, image 1, and image 2 can easily be produced by a partial combination in which the feature areas corresponding to the reference image, image 1, and image 2 are overwritten in the frame memory.

A display operation of the system control circuit 110 formed by a microcomputer will be described with reference to FIGS. 5 and 6.

Figure 5:
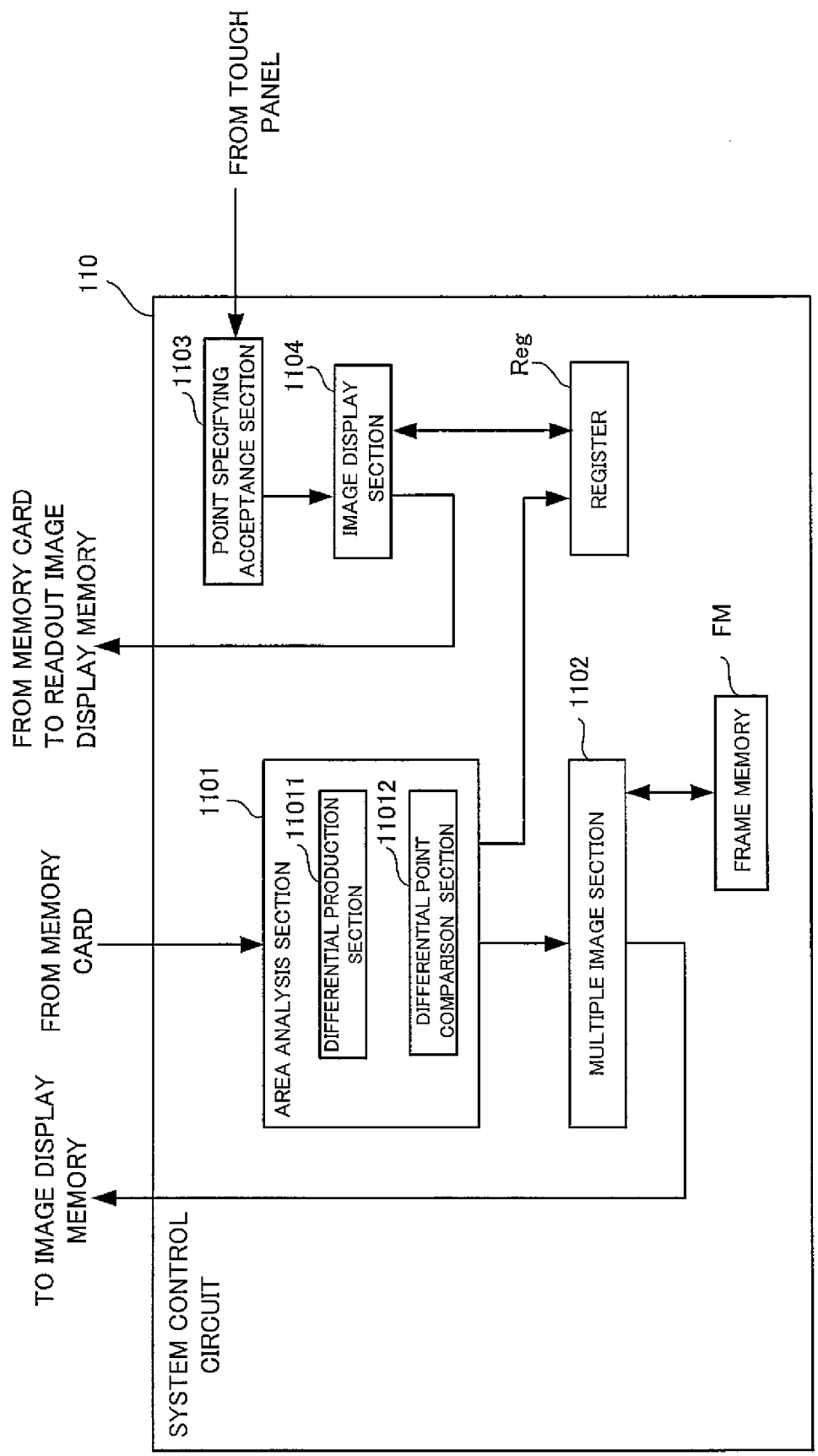
FIG. 5 is a schematic diagram showing functions in the system control circuit 110 formed by a microcomputer.
Figure 6:
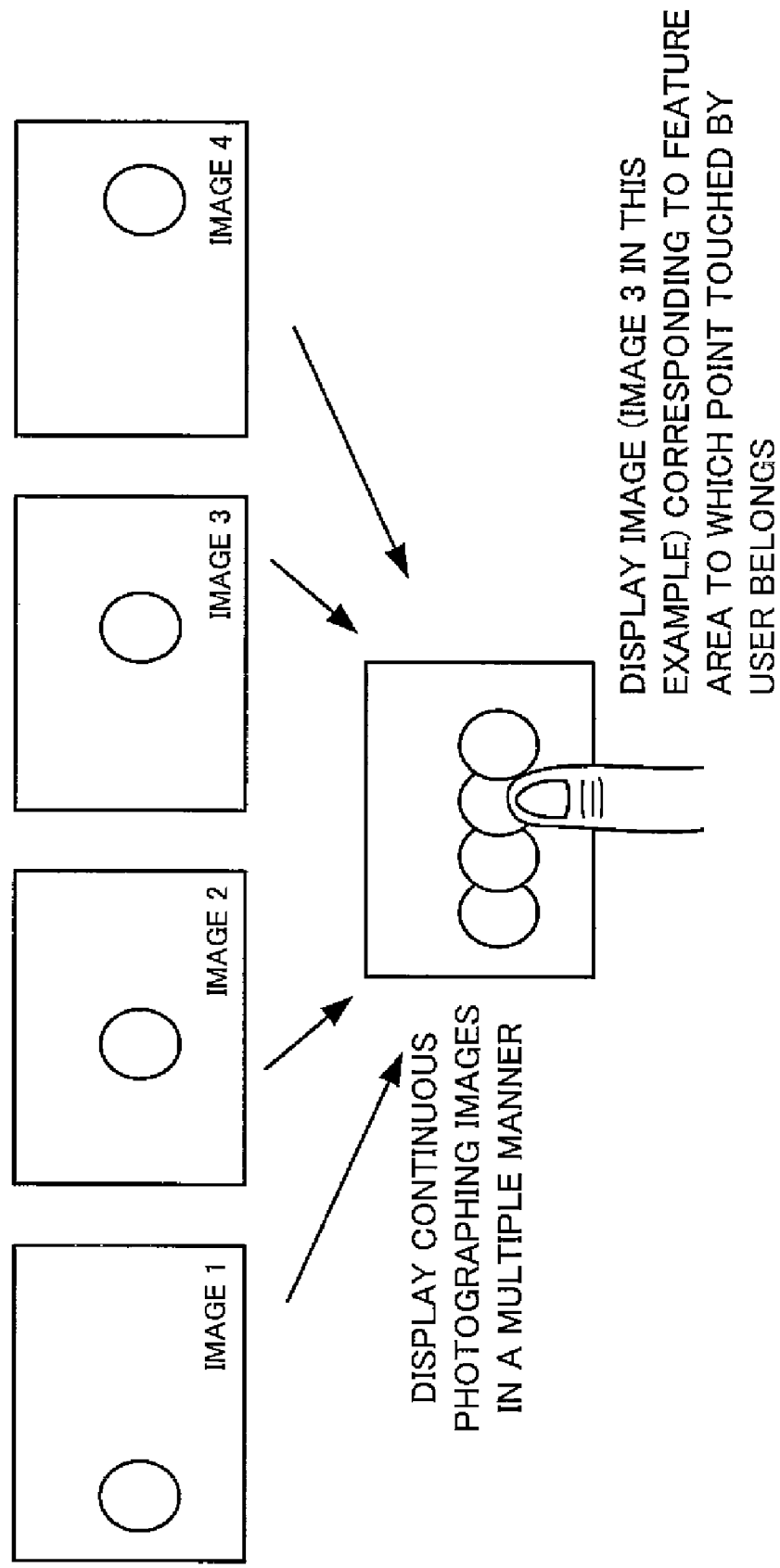
FIG. 6 shows a multiple image displayed on a display screen of an LCD 117 under the control of the system control circuit 110.

FIG. 5 is a schematic diagram showing functions in the system control circuit 110 formed by the microcomputer, and FIG. 6 shows a multiple image displayed on the display screen of the LCD 117 under the control of the system control circuit 110.

As shown in FIG. 5, during the reproduction mode, an area analysis section, a multiple display section, and an image display section are formed in the system control circuit 110 by programs. In the embodiment, programs constituting a differential production section and a differential place comparison section of the present invention are described in the program of the area analysis section. A description relating to handling with the LCD 117 is written in both the programs of the multiple display section and image display section. When the program of a multiple display section 1102 is executed, the one-frame image is transferred from the frame memory in the microcomputer to the image display memory 151 to display the multiple image on the display screen of the LCD 117 under the control of the memory control circuit 110a. When the program of an image display section 1104 is executed, the system control circuit 110 reads the image data from the memory card 800, the memory control circuit 110a transfers the one-frame image data from the frame memory in the compression and decompression circuit 190 to the image display memory 151, and the image specified by the user is displayed on the display screen 117A.

The processing performed by the system control circuit 110 will be described with reference to FIG. 5.

The plural images (for example, three images) are read from the memory card 800, and a differential production section 11011 in an area analysis section 1101 produces the differential image between reference and each image based on one of images displayed by the multiple display section 1102. Then, a differential place comparison section 11012 computes the area of the large differential place (lower stage of FIG. 4) as the feature area in each differential image produced by the differential production section 11011. In the large differential place as the feature area, the position in the image differs from that of the large differential place in the other differential image in the large differential places (middle stage of FIG. 4) in which the difference exceeds the predetermined degree.

In the embodiment, the reference image is recorded in the frame memory FM of the microcomputer, the image of the feature area is overwritten in the frame memory FM of the microcomputer every time the image of the feature area in the lower stage of FIG. 4 is obtained, for example, the feature area of the image 1 and the image 1 in the memory card are correlated with each other when the image of the feature area is overwritten, and the information on the correlation is stored in a register Reg of the microcomputer.

When all the feature areas in the lower stage of FIG. 4 are overwritten in the frame memory FM, the memory control circuit 110a transfers the image in the frame memory FM to the image display memory 151, and the LCD 117 displays the images on the display screen while the images are visually overlapped as shown in FIG. 6.

After the visually-overlapped images are displayed on the display screen as shown in FIG. 6, when the user manipulates the touch panel 130 to specify one of the points on the display screen 117A, a point specifying acceptance section 1103 of the system control circuit 110 receives the specifying manipulation to supply a coordinate of the specified point to the image display section 1104. Based on the coordinate, the image display section 1104 refers to the register in the microcomputer to read the image corresponding to the feature area to which the point belongs, and the image display section 1104 supplies the image to the compression and decompression circuit to decompress the image data. The memory control circuit transfers the decompressed image data to the image display memory 151. The LCD 117 displays the image in the image display memory 151 on the display screen 117A of the LCD 117.

For example, when the point shown in FIG. 6 is specified by a finger in the visually-overlapped images, the image 3 corresponding to the feature-area to which the specified point belongs is read from the memory card 800 and displayed on the display screen.

A procedure of the display processing performed by the system control circuit 110, the memory control circuit 110a, and the LCD 117 in the display device. The display device includes the system control circuit 110, the memory card 800, the compression and decompression circuit 190, the memory control circuit 110a, the image display memory 151, the D/A conversion circuit 160, and the LCD 117.

Figure 7:
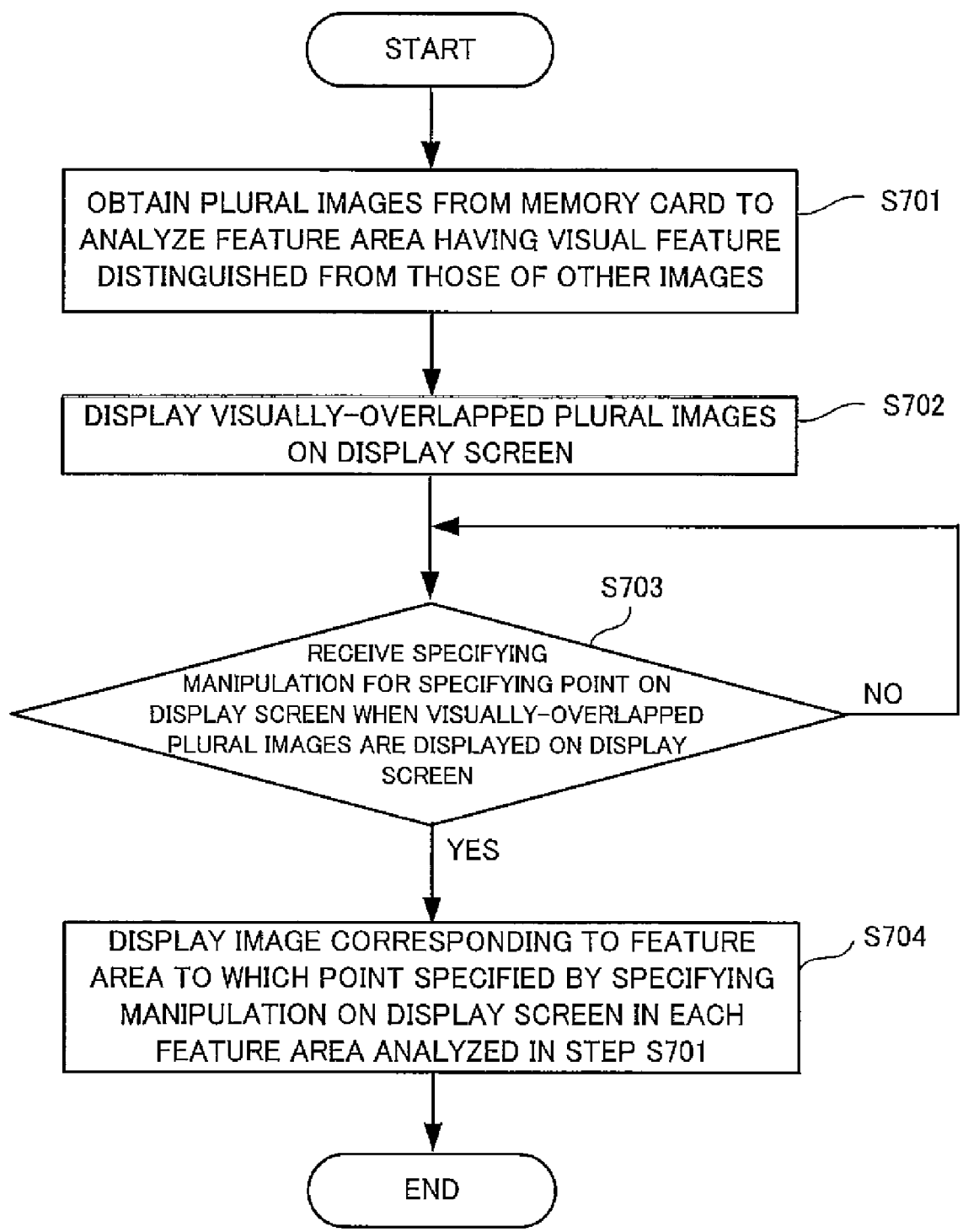
FIG. 7 is a flowchart showing a procedure of display processing performed by the system control circuit 110.

FIG. 7 is a flowchart showing the procedure of the display processing performed by the system control circuit 110, the memory control circuit 110a, and the LCD 117. The display device includes the system control circuit 110, the memory card 800, the compression and decompression circuit 190, the memory control circuit 110a, the image display memory 151, the D/A conversion circuit 160, and the LCD 117.

In step S701, the system control circuit 110 obtains plural similar images from the memory card 800, the system control circuit 110 analyzes the feature area having the visual feature which is distinguished from those of other images for each of the plural images, the system control circuit 110 writes the coordinate of the feature area in the register while storing the reference image and the image of the feature area in the frame memory. In step S702, the memory control circuit 110a transfers the reference image stored in the frame memory and the overwritten images of the plural feature areas to the image display memory 151, and the LCD 117 displays the images in the image display memory on the display screen. In step S703, when the images of the plural feature areas are displayed on the display screen while overlapped with the reference image, the system control circuit 110 receives the specifying manipulation for specifying the point on the display screen, and the system control circuit 110 refers to the coordinate in the internal register to read the image corresponding to the feature area to which the point specified by the specifying manipulation belongs from the memory card 800, the system control circuit 110 supplies the image to the compression and decompression circuit to decompress the image data, and the system control circuit 110 tentatively stores the decompressed image data in the frame memory. The memory control circuit 110*a* transfers the image data in the compression and decompression circuit 190 to the image display memory 151, and the LCD 117 displays the image in the image display memory on the display screen.

Thus, in the digital camera of the embodiment, only the user performs such the simple manipulation that the user manipulates the touch panel on the display screen, which allows the user to find out the desired image in a short time.

The CCD 120 as the imaging device of the embodiment can perform the readout at a high frame rate as described above. Therefore, for example, in the case where an extremely short photographing interval is set to perform the continuous photographing of the moving object, a huge number of images which are continuously photographed at extremely short photographing intervals are stored in the memory card 800.

Figure 8:
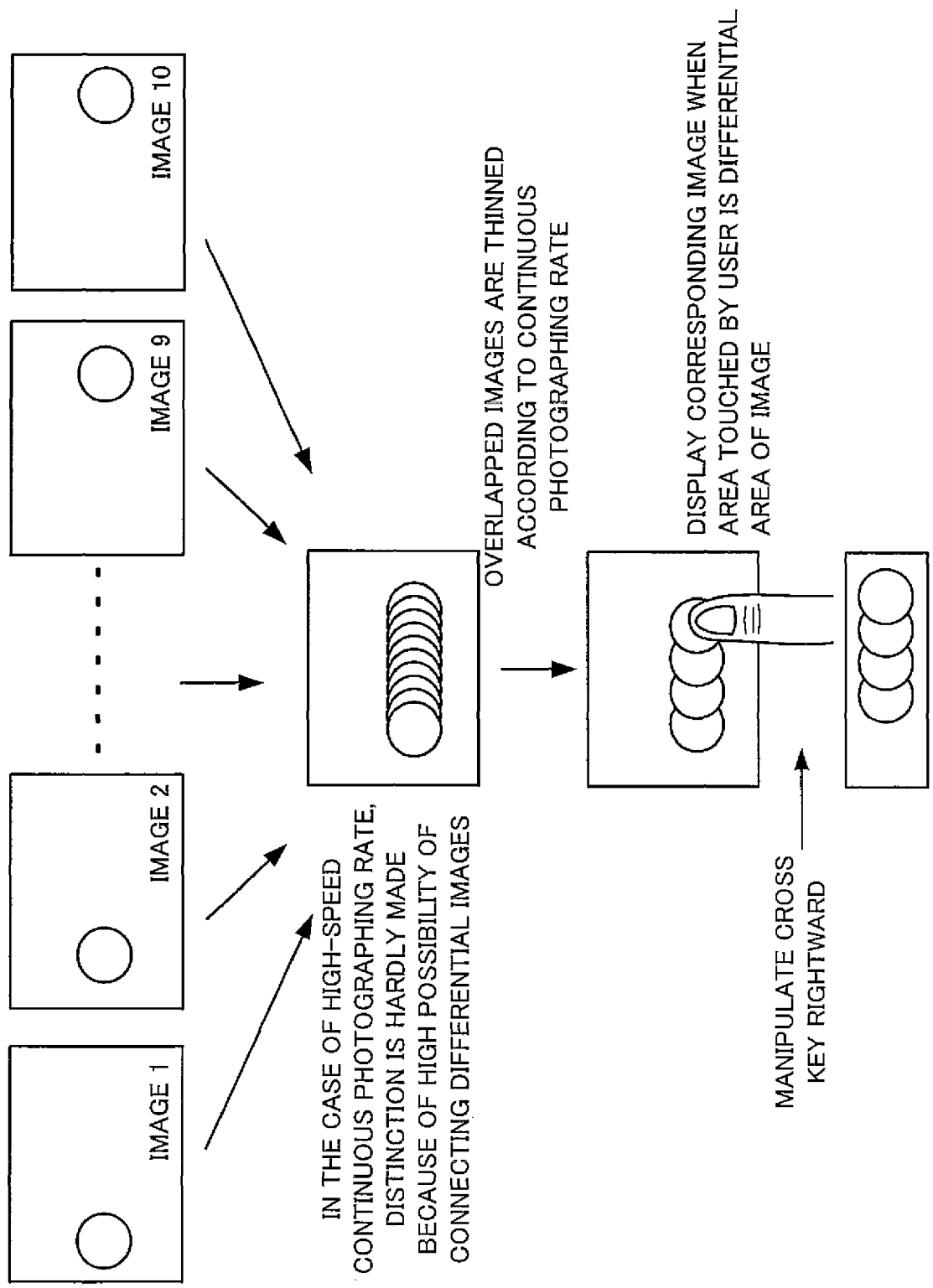
FIG. 8 is a view showing a display example of a multiple image when readout is performed at a high frame rate from CCD.

FIG. 8 is a conceptual view showing the multiple image in the case of the extremely short photographing interval of the continuous photographing. A second stage of FIG. 8 shows an example of the case in which the continuous photographing images obtained at extremely short photographing intervals are simply overlapped to perform the multiple display.

As shown in FIG. 8, in the images obtained by the continuous photographing having the extremely short photographing interval, because the subject position is photographed while shifted little by little, the large differential place shown in the middle stage of FIG. 4 is also shifted little by little, and the places are largely overlapped as shown in the second stage of FIG. 8 when all the places are overlapped on one screen. When the common portion is erased by the processing of FIG. 4, only the small portions at upper and lower ends of the round large differential place are left as the feature area, and the multiple display and the image specifying manipulation are hardly performed. Therefore, in the embodiment, the system control circuit 110 refers to the frame rate in the tag area of the image file to determine the photographing interval, or the system control circuit 110 reads some images of the continuous photographing images to determine the photographing interval. At this point, it is assumed that only three kinds of photographing intervals, that is, 10 fps, 20 fps, and 30 fps can be selected in the embodiment.

When the system control circuit 110 determines photographing interval is 10 fps, it is believed that the overlapping of the large differential places has a low probability, so that the images are read one by one to perform the processing of FIG. 4. When the system control circuit 110 determines photographing interval is 20 fps, it is believed that the overlapping of the large differential places has a somewhat high probability, for example, so that the image is thinned out every two frames from the memory card to perform the processing of FIG. 4. When the system control circuit 110 determines photographing interval is 30 fps, it is believed that the overlapping of the large differential places has a considerably high probability, for example, so that the images are read every three frames to perform the processing of FIG. 4.

The screen shown in a third stage of FIG. 8 is obtained when the images which are read while thinned out from the memory card, after the processing of FIG. 4 is performed to correlate the feature area and the image.

In the case where the images are read every several frames, the image is not read from the head, but from the second or third, thereby obtaining various correlations between the feature area and the image.

Therefore, in the embodiment, a program constituting a switching acceptance section of the present invention is described in the system control circuit 110, for example, the switching acceptance section accepts the manipulation of the cross key 122, and the visually-overlapped plural images in which the images obtained by the continuous photographing function are thinned out are displayed instead of the currently-displayed images as shown in a fourth stage of FIG. 8, so that the portions which are not displayed in the currently-displayed multiple image can sequentially be displayed.

That is, the switching acceptance section of the present invention which accepts the switching manipulation for switching the image displayed by the multiple display section is provided, and the multiple display section displays the visually-overlapped plural images in which the images obtained by the continuous photographing function are thinned out instead of the currently-displayed images when the switching acceptance section accepts the switching manipulation.

Therefore, when the user specifies the feature area to find out the desired image, various feature areas can finely be specified on the display screen.

Figure 9:
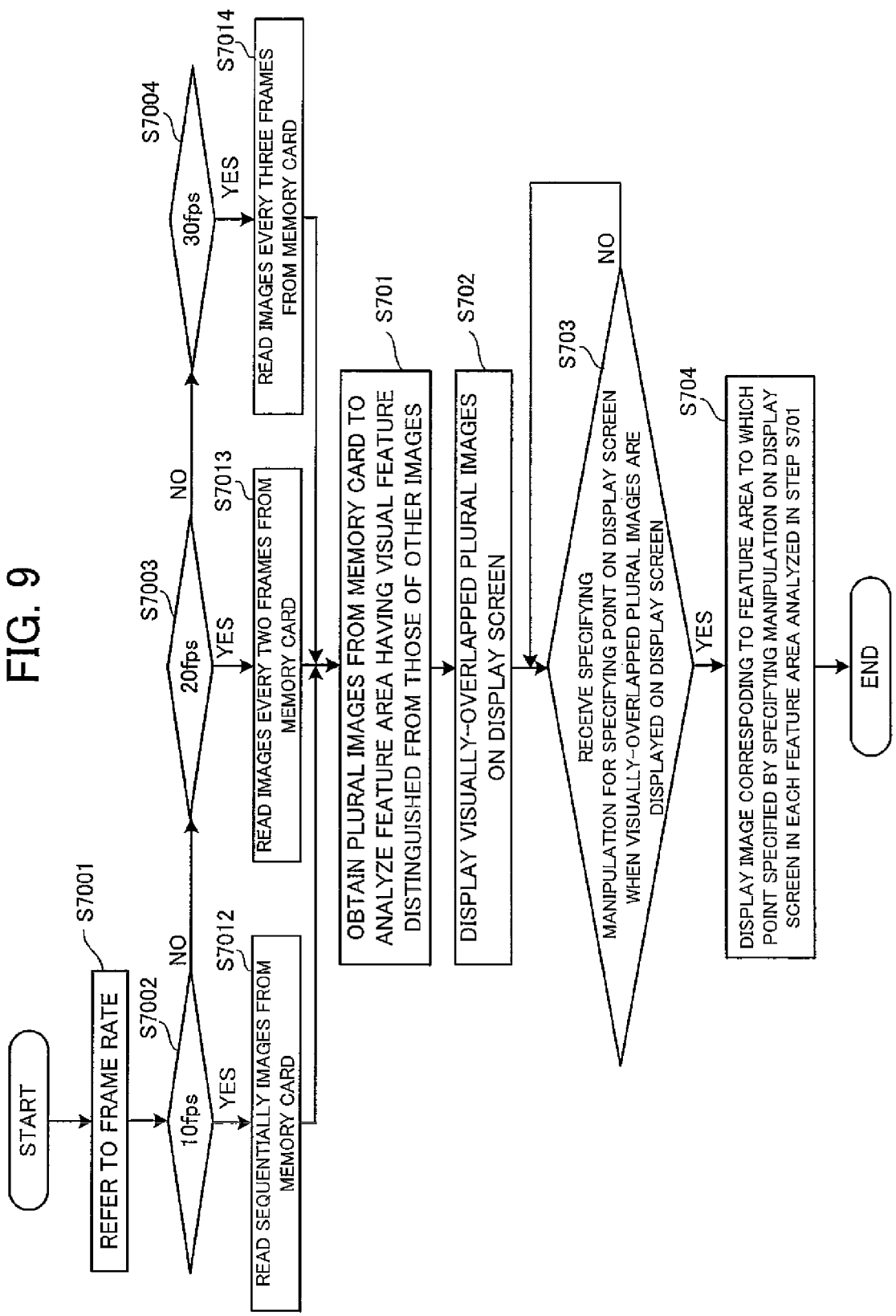
FIG. 9 is a flowchart showing detailed processing in step S702 performed by a multiple display section of the system control circuit 110.

FIG. 9 is a flowchart showing the detailed processing in step S702 performed by the multiple display section of the system control circuit 110.

In the processing in step S7001 of FIG. 9, the multiple display section refers to the frame rate in the tag information of the image file stored in the memory card.

When the multiple display section determines that the frame rate is 10 fps in step S7002, the flow goes to step S7012. In step S7012, the multiple display section sequentially reads the images from the memory card, and the processing of FIG. 7 is performed.

When the multiple display section determines that the frame rate is 20 fps in step S7003, the flow goes to step S7013. In step S7013, the multiple display section reads the images every two frames from the memory card, and the processing of FIG. 7 is performed.

When the multiple display section determines that the frame rate is 30 fps in step S7004, the flow goes to step S7014. In step S7014, the multiple display section reads the images every three frames from the memory card, and the processing of FIG. 7 is performed. Therefore, the multiple image in which the specifying manipulation is easily performed can be obtained as shown in a lower portion of FIG. 8.

Figure 10:
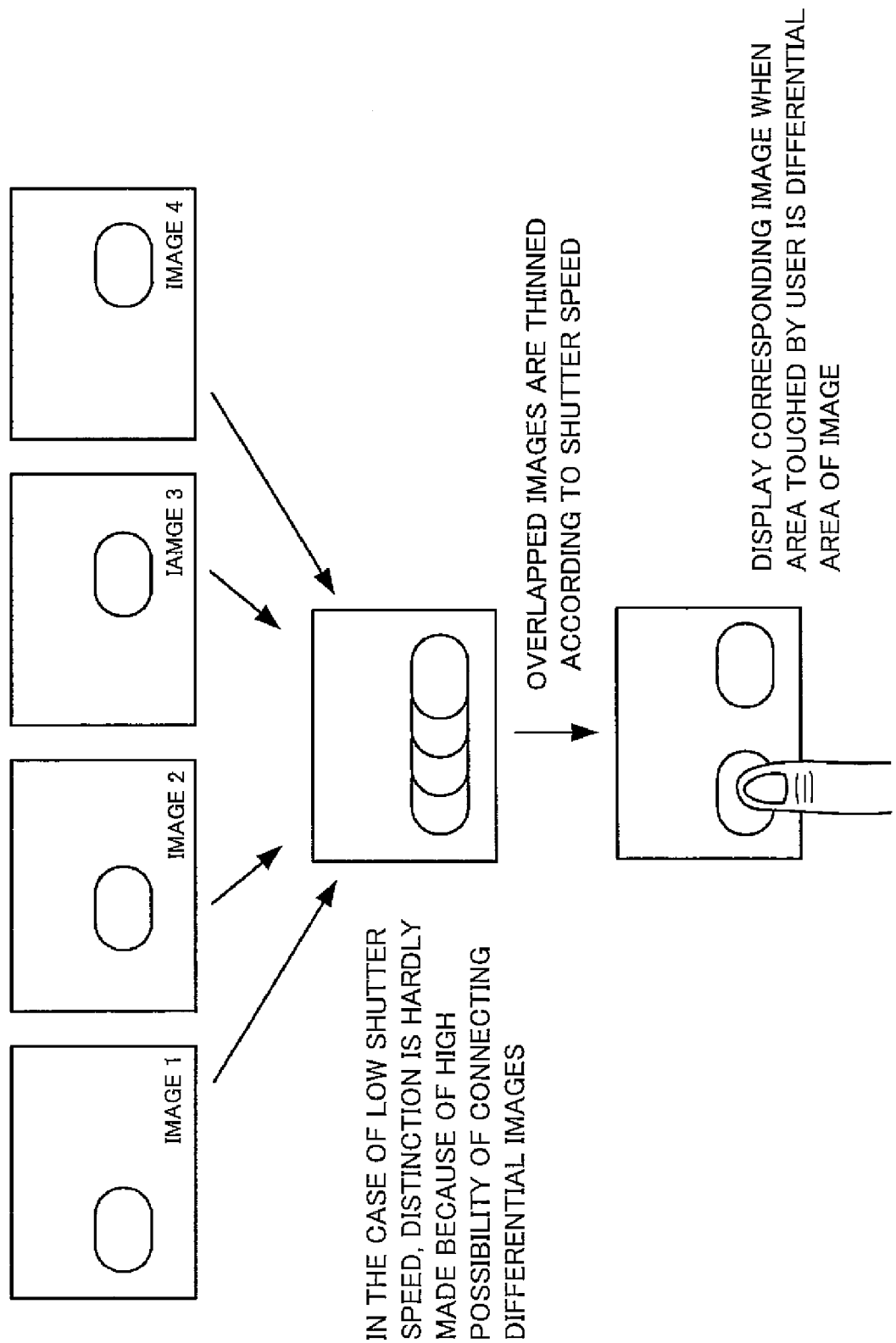
FIG. 10 shows a display example on the display screen.

In addition to the photographing interval, when the shutter speed is lowered in each photographing in the continuous photographing function, the moving object in the subject blurs to form the image in which the moving objects are connected by the multiple display as shown in FIG. 10.

FIG. 10 conceptually shows the multiple image in which the moving object are connected.

Therefore, in the embodiment, as shown in FIG. 10, a multiple display section 1102 (see FIG. 5) in the system control circuit 110 thins out the images obtained by the continuous photographing function according to the shutter speed to display the remaining plural images.

Figure 11:
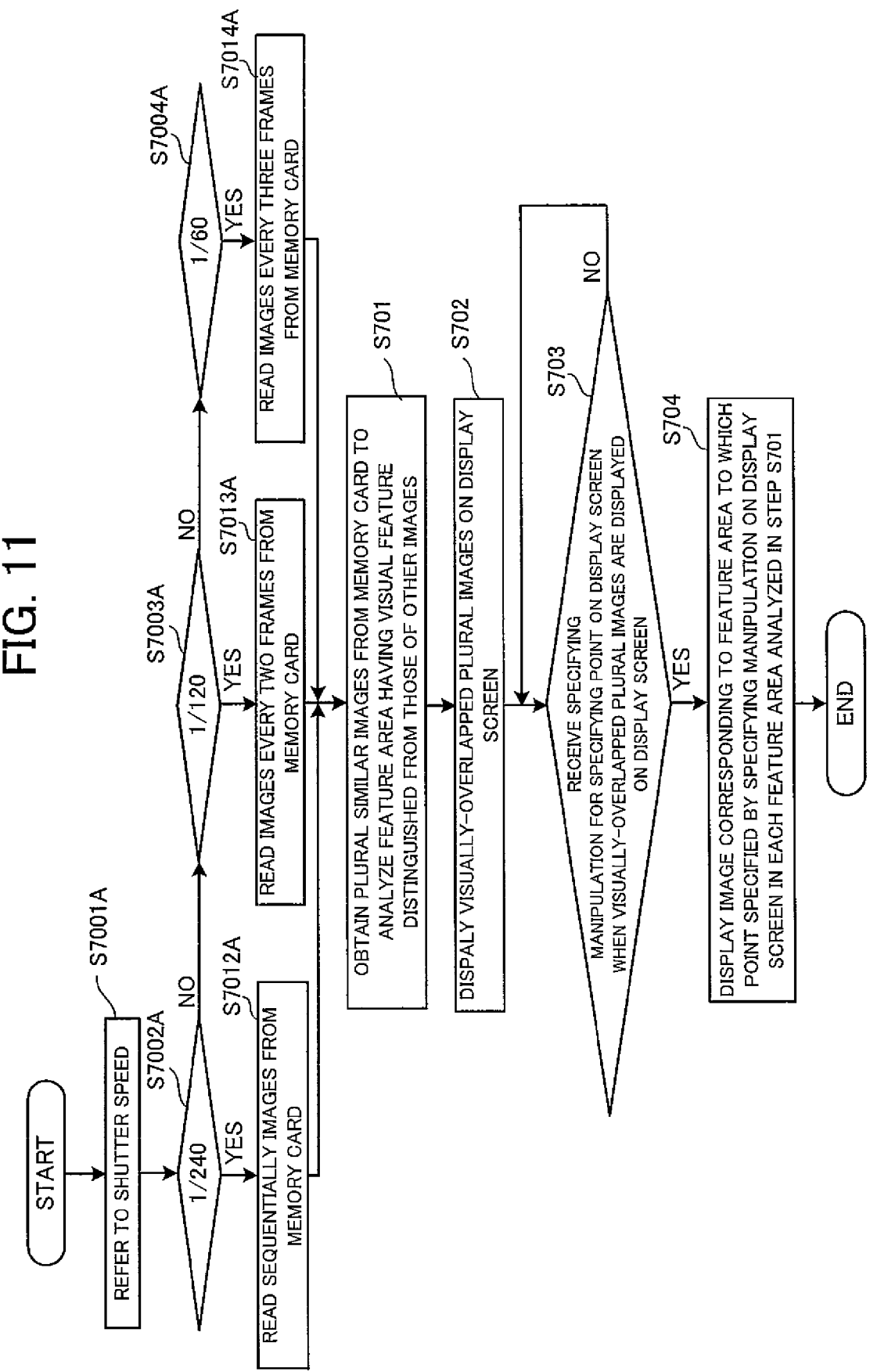
FIG. 11 is a flowchart showing a procedure of display processing performed by the multiple display section of the system control circuit.

FIG. 11 is a flowchart showing a procedure of display processing performed by the multiple display section 1102 of the system control circuit 110.

The multiple display section 1102 reads the shutter speed in the tag area through processing in step S7001A of FIG. 7 to determine the shutter speed of the photographic image.

For the sake of convenience, for example, it is assumed that the shutter speed is selected from one of $1/240$, $1/120$, and $1/60$. When the multiple display section 1102 determines that the shutter speed is $1/240$ in step S7002A, the flow goes to step S7012A. In step S7012A, because of the high shutter speed, the images are sequentially read from the memory card, and the processing of FIG. 7 is performed.

When the multiple display section 1102 determines that the shutter speed is $1/120$ in step S7003A, the flow goes to step S7013A. In step S7013A, because of the somewhat low shutter speed, the images are read every two frames from the memory card, and the processing of FIG. 7 is performed.

When the multiple display section 1102 determines that the shutter speed is $1/60$ in step S7004A, the flow goes to step S7014A. In step S7014A, because of the lowest shutter speed, the images are read every three frames from the memory card, and the processing of FIG. 7 is performed. Therefore, the multiple image in which the specifying manipulation is easily performed can be obtained as shown in a lower portion of FIG. 10.

In the display processing of FIG. 11, similarly to the frame rate, preferably the switching acceptance section is provided in the system control circuit 110, and the display is switched in response to the switching manipulation of the cross key.

In the embodiment, the continuous photographing images taken by the usual digital camera is described as the plural images. Alternatively, in the present invention, the plural images may be fixed-point observation images taken by a security camera or a weather camera, images extracted from the moving images, or similar images accumulated in an archive. In the embodiment, only the images of the feature areas of the differential images are multiple-displayed. Alternatively, in the present invention, the plural images may be displayed and visually overlapped while switched at high speed, or the plural images may be displayed while all the images are overlapped to form the multiple image.

Although the touch panel is used as the point specifying acceptance section in the embodiment, a pointing device may be used in the present invention. The display device of the present invention may be a personal computer or the like, and the display method of the present invention may be reflected on an application program installed in the personal computer.

What is claimed is:

1. A photographing apparatus, comprising:
an imaging section that generates, in a form of image data, a sequence of one or more images each of which represents a subject, by photographing the subject continuously at definite time intervals corresponding to a photographing interval which is selected by a user from among different photographing intervals;
a display screen;
a multiple display section that extracts, from the one or more images generated by the imaging section, a plurality of images which are arranged in the sequence of the one or more images at intervals of a number of images determined according to the selected photographing interval, and that displays the plurality of images on the display screen in such a manner that the plurality of images are visually overlapped;
an area analysis section that analyzes a feature area having a visual feature for each of the plurality of images, the visual feature distinguishing the each of the plurality of images from other images in the plurality of images; and
a switching acceptance section that accepts switching manipulation from the user for switching images to be displayed on the display screen from the plurality of images to another plurality of images in the one or more images;
wherein
when the switching acceptance section accepts the switching manipulation, the multiple display section extracts, from the one or more images generated by the imaging section, a different plurality of images which are arranged in the sequence of the one or more images at the intervals of the number of images and whose positions in the sequence are shifted by a predetermined number of images from positions of the plurality of images in the sequence, and that displays, as the another plurality of images, the different plurality of images on the display screen instead of the plurality of images in such a manner that the different plurality of images are visually overlapped,
the area analysis section analyzes a feature area having a visual feature for each of the different plurality of images, the visual feature distinguishing the each of the different plurality of images from other images in the different plurality of images, and
the photographing apparatus further comprises:
a point specifying acceptance section that accepts, while the multiple display section is displaying the plurality of images or the different plurality of images, specifying manipulation from the user for specifying a point on the display screen which is included in one feature area of the feature areas corresponding respectively to the plurality of images or the different plurality of images; and
an image display section that displays, instead of the plurality of images or the different plurality of images, one image of the plurality of images or one image of the different plurality of images on the display screen corresponding to the one feature area including the point specified by the specifying manipulation, when the point specifying acceptance section accepts the specifying manipulation.

2. A photographing apparatus comprising:
an imaging section that generates, in a form of image data, a sequence of one or more images each of which represents a subject, by photographing the subject continuously at definite time intervals corresponding to a shutter speed which is selected by a user from among different shutter speeds;
a display screen;
a multiple display section that extracts, from the one or more images generated by the imaging section, a plurality of images which are arranged in the sequence of the one or more images at intervals of a number of images determined according to the selected shutter speed, and that displays the plurality of images on the display screen in such a manner that the plurality of images are visually overlapped;
an area analysis section that analyzes a feature area having a visual feature for each of the plurality of images, the visual feature distinguishing the each of the plurality of images from other images in the plurality of images; and
a switching acceptance section that accepts switching manipulation from the user for switching images to be displayed on the display screen from the plurality of images to another plurality of images in the one or more images;

wherein when the switching acceptance section accepts the switching manipulation, the multiple display section extracts, from the one or more images generated by the imaging section, a different plurality of images which are arranged in the sequence of the one or more images at the intervals of the number of images and whose positions in the sequence are shifted by a predetermined number of images from positions of the plurality of images in the sequence, and that displays, as the another plurality of images, the different plurality of images on the display screen instead of the plurality of images in such a manner that the different plurality of images are visually overlapped, the area analysis section analyzes a feature area having a visual feature for each of the different plurality of images, the visual feature distinguishing the each of the different plurality of images from other images in the different plurality of images, and the photographing apparatus further comprises:

a point specifying acceptance section that accepts, while the multiple display section is displaying the plurality of images or the different plurality of images, specifying manipulation from the user for specifying a point on the display screen which is included in one feature area of the feature areas corresponding respectively to the plurality of images or the different plurality of images; and an image display section that displays, instead of the plurality of images or the different plurality of images, one image of the plurality of images or one image of the different plurality of images on the display screen corresponding to the one feature area including the point specified by the specifying manipulation, when the point specifying acceptance section accepts the specifying manipulation.

3. The photographing apparatus according to claim 1, wherein the multiple display section displays at least three images as the plurality of images or the different plurality of images, and the area analysis section further includes:

a differential production section that uses one of the plurality of images or one of the different plurality of images as a reference for the plurality of images or the different plurality of images and that produces differential images which show differences of the plurality of images except for the reference or the different plurality of images except for the reference from the reference; and a differential place comparison section which computes, as the feature area, an area in a large differential place which have a difference exceeding a predetermined degree in each of the differential images produced by the differential production section, a position of the area in the each of the differential images being not common among the differential images.

4. The photographing apparatus according to claim 2, wherein the multiple display section displays at least three images as the plurality of images or the different plurality of images, and the area analysis section further includes:

a differential production section that uses one of the plurality of images or one of the different plurality of images as a reference for the plurality of images or the different plurality of images and that produces differential images which show differences of the plurality of images except for the reference or the different plurality of images except for the reference from the reference; and a differential place comparison section which computes, as the feature area, an area in a large differential place which have a difference exceeding a predetermined degree in each of the differential images produced by the differential production section, a position of the area in the each of the differential images being not common among the differential images.

5. The photographing apparatus according to claim 1, wherein the display screen is a touch panel, and the point specifying acceptance section accepts, as the specifying manipulation, a touch of the user on the point on the display screen.

6. The photographing apparatus according to claim 2, wherein the display screen is a touch panel, and the point specifying acceptance section accepts, as the specifying manipulation, a touch of the user on the point on the display screen.

* * * * *